United States Patent Office 2,849,439
Patented Aug. 26, 1958

2,849,439

TREATMENT OF SOLUTIONS OF ORGANIC ACID ESTERS OF CELLULOSE

Henry W. Steinmann, Madison, N. J., assignor to Celanese Corporation of America, New York, N. Y., a corporation of Delaware No Drawing. Application June 28, 1955
Serial No. 518,655

20 Claims. (Cl. 260—227)

This invention relates to the production of organic acid esters of cellulose and relates more particularly to a method for the production of organic acid esters of cellulose by the homogeneous or solution process.

An important object of this invention is to provide an improved method for the production of organic acid esters of cellulose by the homogeneous or solution process which will yield directly a solution suited for spinning.

Other objects of this invention will be apparent from the following detailed description and claims.

In my copending application Serial No. 443,957, filed July 16, 1954, there is disclosed a novel method for the production of organic acid esters of cellulose. According to this method, cellulose is esterified with an organic acid anhydride in the presence of a water-immiscible solvent for the organic acid ester of cellulose being formed. At the completion of the esterification there is obtained a substantially homogeneous esterification solution. This solution may then be treated to ripen or partially hydrolyze the organic acid ester of cellulose, if desired. The esterification solution is then extracted with an aqueous medium under such conditions that two phases are present and no precipitation of the organic acid ester of cellulose from the solution takes place. The solution obtained in accordance with the process disclosed in the aforementioned application contains a proportion of water which should be removed therefrom before the said solution is employed for the spinning of filaments, the casting of films, or for other purposes. The necessity for removing water from the said solution increases the overall cost of the process.

I have now discovered that the proportion of water that will be picked up by the solution of the organic acid ester of cellulose during the extraction of said solution with an aqueous medium may be appreciably reduced if an electrolyte is dissolved in the aqueous extraction medium. The small amount of water in the organic acid ester of cellulose solution obtained in this manner permits the said solution to be used for certain applications without further dewatering. Where the application requires that the solution contain an even smaller proportion of water, the dewatering of the solution obtained in accordance with the process of this invention is considerably simplified owing to the relatively small amounts of water initially present therein.

Prior to carrying out the esterification the cellulose may advantageously be pretreated, according to the usual practice in the art, to increase its reactivity and thereby shorten the esterification time. Such pretreatment may be effected by adding to the cellulose small quantities of a lower aliphatic acid such as, for example, formic acid, acetic acid, propionic acid or butyric acid, as well as mixtures thereof. There may also be added to the cellulose during the pretreatment all or a portion of the esterification catalyst. The pretreatment of the cellulose may be carried out in a single stage, or in a plurality of stages, all as well known in the art.

The pretreated cellulose is then esterified with an organic acid anhydride corresponding to the organic acid ester of cellulose being formed in the presence of a water-immiscible solvent for the said ester. Suitable water-immiscible solvents for this purpose include, for example, nitromethane, m-cresol, cyclopentanone, pyrrole and furfural. Chlorinated hydrocarbon solvents such as methylene chloride, tetrachloroethane, trichloroethane, trichloroethanol and chloroform may also be employed for this purpose. Extremely valuable results are obtained when methylene chloride is employed as the solvent since it yields solutions that are especially well suited for spinning. Instead of employing a single material as the solvent, a mixture of materials, such as those specified above, may be used for this purpose. The quantity of solvent may range from the minimum necessary to dissolve the organic acid ester of cellulose being formed to any desired maximum. The use of excessively large quantities of solvent is, however, economically undesirable since it involves an added expense in recovering the solvent. When methylene chloride is employed as the solvent, good results have been obtained with from about 700 to 2500 parts by weight of methylene chloride for each 100 parts by weight of cellulose. The quantity of organic acid anhydride is not critical, good results having been obtained with from about 2.4 to 5.0 moles of organic acid anhydride for each 100 parts by weight of cellulose. The quantity of organic acid anhydride specified is in excess of that required to react with any water which may be introduced into the esterification mixture with the cellulose, the pretreating agent, the water-immiscible solvent or from any other source.

The esterification is normally carried out in the presence of an esterification catalyst, which may, for example, be sulfuric acid, perchloric acid, anhydrous ferric chloride, or aromatic and alkyl sulfonic acids. The quantity of such catalyst may range from as little as about 0.5% by weight, or less, to as much as about 5% by weight, or even more, based on the weight of the cellulose, with smaller quantities of catalyst requiring longer reaction times and larger quantities of catalyst requiring shorter reaction times. The esterification reaction is normally carried out at temperatures of between about 0 to 50° C.

As the esterification proceeds, the organic acid ester of cellulose being formed will dissolve in the esterification mixture so that at the end of the esterification there will be obtained a substantially homogeneous solution. This solution will contain, in addition to the organic acid ester of cellulose and the water-immiscible solvent therefor, the esterification catalyst, the unreacted organic acid anhydride and a certain proportion of organic acid. The organic acid is derived from a number of sources including the pretreatment acid, the organic acid that is formed by the reaction of the organic acid anhydride with any water that is present in the esterification mixture, the organic acid that is formed by the esterification reaction and any organic acid that is initially present in the organic acid anhydride.

As disclosed in my copending application, Serial No. 470,825, filed November 23, 1954, the acid esterification catalyst, such as perchloric acid may then be neutralized with a nitrogenous base that will react therewith to form an ammonium perchlorate. Suitable nitrogenous bases that may be used for this purpose are ammonia and amines, including aliphatic and aromatic primary, secondary and tertiary amines, as well as amines in which the nitrogen atom forms a part of a heterocyclic ring. Examples of such nitrogenous bases are ammonia, diethylamine, piperidine, quinoline, pyridine, triethylamine, aniline, ethylamine, trimethylamine and dimethylamine. The nitrogenous bases are soluble in the esterification solution and react with the perchloric acid present therein to give ammonium perchlorates which may be substituted or not. On extraction of the esterification solution with an aqueous medium, the ammonium perchlorates enter the aqueous phase readily, showing no tendency to be absorbed or adsorbed by the colloidal or sub-colloidal particles of the organic acid ester of cellulose. The quantity of nitrogenous base that is employed should be at least sufficient to neutralize all of the perchloric acid, quantities providing a 10 to 50% molar excess of the nitrogenous base as compared with the perchloric acid, being preferred. The nitrogenous base may be added to the esterification solution per se, or may be added to the esterification solution together with a sufficient quantity of water to convert all the organic acid anhydride remaining in the said solution to the corresponding organic acid.

For many purposes, it is desirable to ripen or partially hydrolyze the organic acid ester of cellulose to increase the average number of free hydroxyl groups per anhydroglucose unit in the cellulose molecule. Such ripening may be readily carried out by adding sufficient water to the solution to convert any remaining organic acid anhydride to the corresponding acid, together with an excess of water which may range from about 50 to 100 parts by weight for each 100 parts by weight of cellulose. Following the addition of the water, the solution is held, preferably with agitation, until the desired degree of hydrolysis has taken place. The temperature of the solution may be raised to increase the speed of the ripening process. It may also be desirable in some cases to add a quantity of a mineral acid to the solution to accelerate the ripening, or it may be desirable to neutralize all or a portion of the acid esterification catalyst to slow down the ripening. The addition of further quantities of mineral acid to the ripening solution or the neutralization of all or a portion of the acid catalyst therein may be effected at the beginning of the ripening process or after the ripening has proceeded to some extent. If the ripening is carried to the point where there is an appreciable reduction in the number of the ester groups in the organic acid ester of cellulose, it is desirable to add to the ripening solution a small proportion of a water-miscible solvent, such as methanol, ethanol, or the like to avoid the precipitation of the ripened organic acid ester of cellulose from the water-immiscible solvent. In this case, it may also be desirable to have present in the aqueous medium employed for the extraction step, a low percentage of a water-miscible solvent to prevent the precipitation of the organic acid ester of cellulose.

To effect the partial or complete neutralization of the acid esterification catalyst during the ripening of the organic acid ester of cellulose, there is employed a nitrogenous base as specified above so that the ammonium salt formed on neutralization will be readily removed from the esterification solution during the extraction thereof with an aqueous medium. After the ripening of the organic acid ester of cellulose is complete, a nitrogenous base is added to the esterification solution in an amount at least sufficient to neutralize all the acid esterification catalyst present therein as well as all the mineral acid that may have been added during the ripening step. Preferably, as pointed out above, there is added to the esterification solution an excess of nitrogenous base.

The solution of organic acid ester of cellulose is then extracted with an aqueous medium having dissolved therein an electrolyte to remove from the cellulose ester solution the organic acids, salts and other water-soluble substances present therein. The presence of the electrolyte in the aqueous extracting medium materially reduces the amount of water in the extracted organic acid ester of cellulose solution. While all electrolytes have been found effective, improved results are obtained when the electrolyte is one that ionizes to produce polyvalent ions and the best results are obtained when the electrolyte is one that ionizes to produce polyvalent anions or, preferably both polyvalent anions and polyvalent cations. The effectiveness of any given electrolyte in reducing the water content of the extracted organic acid ester of cellulose solution will depend generally upon the concentration of the said electrolyte in gram-ions, calculated on the assumption that the electrolyte is completely ionized. The gram-ion concentration is the atomic or molecular weight of an ion expressed in grams so that one gram-ion of sodium, for example, is 22.997 grams of sodium ions. Good results have been obtained when the concentration of the electrolyte in the aqueous extracting medium is such as to give a total concentration of between about 0.1 and 1 gram-ions per liter, assuming that the electrolyte is completely ionized. Examples of suitable electrolytes are monobasic ammonium phosphate, sodium citrate, aluminum sulfate, ammonium acetate, magnesium acetate, calcium acetate, magnesium sulfate, sodium acetate, sodium sulfate, calcium chloride, sodium chloride and aluminum chloride.

During the extraction, the proportion of water-immiscible solvent should be sufficiently high so that no precipitation of the organic acid ester of cellulose from solution takes place. The solution does develop a cloudy appearance during the extraction, which cloudiness is probably due to the formation of an emulsion with the small amount of water picked up by the solution. However, since there is no separation of the organic acid ester of cellulose from the emulsion, it will hereinafter also be referred to as a solution.

The necessary proportion of water-immiscible solvent will depend, among other things, on the concentration of the organic acid ester of cellulose, the amount of organic acid present, the concentration of salts, and the temperature of the solution. For any given set of conditions, the necessary proportion of water-immiscible solvent may be readily ascertained. In some cases, the amount of water-immiscible solvent necessary to avoid precipitation during the extraction may be present in the esterification solution from the very outset. However, this may, in some cases, greatly increase the dilution of the esterification solution above that required for the esterification itself and thereby reduce the quantity of organic acid ester of cellulose that can be prepared in a reactor of given volume. In such cases, it may be desirable to carry on the esterification in the presence of a smaller amount of water-immiscible solvent and then add to the esterification solution, before or after ripening the same, a further quantity of water-immiscible solvent before extracting the solution with an aqueous medium. The addition of a further quantity of water-immiscible solvent also reduces the viscosity of the solution whereby it may be handled more easily and whereby the extraction will proceed more rapidly.

When the extraction is carried out without first ripening the organic acid ester of cellulose, the esterification solution will normally have present therein a certain proportion of organic acid anhydride. At the beginning of the extraction this organic acid anhydride will be converted to the corresponding organic acid by reaction with the extraction water brought into contact with the esterification solution if there is present in the esterification solution a mineral acid, which may be the esterification catalyst, to catalyze the reaction between the anhydride and the water. Otherwise, the reaction between the anhydride and the water will proceed at a very slow rate and at least a portion of the anhydride will be extracted as such from the esterification solution.

The aqueous medium employed for the extraction may be water itself. There may also be used a mixture of water and a low percentage of a water-miscible solvent or partially water-miscible solvent such as methanol, ethanol, normal propanol, isopropanol, ethyl acetate, pyridine, acetone and methyl acetate. The addition of the water-miscible solvent offers the advantage that the extraction proceeds more rapidly than when water alone is used as the extractant. However, in this case, the organic acid ester of cellulose solution obtained will contain a certain proportion of the water-miscible solvent which may be undesirable.

There may also be present during the extraction a small proportion of a surface active agent, ranging from about 0.001 to about 0.1% by weight, based on the weight of the organic acid ester of cellulose solution. The presence of the surface active agent reduces the tendency of the solution of the organic acid esters of cellulose to adhere to any surfaces with which it comes in contact. If such adherence occurs, there is the danger that the organic acid ester of cellulose will precipitate. Even if no precipitation occurs, the adherence of the organic acid ester of cellulose solution is undesirable since it makes for a non-uniform flow of the said solution through the extraction zone. The surface active agent may be added to the solution of organic acid ester of cellulose or to the aqueous extracting medium. The addition of the surface active agent to the organic acid ester of cellulose solution reduces the tendency of the said solution to adhere to any surfaces with which it comes into contact during all its handling. Examples of surface active agents that are suitable for this purpose are sodium lauryl sulfate, alkyl benzene sodium sulfonate, alkyl naphthalene sulfonate, polyoxyethylene ester of fatty acids and alkyl aryl polyethylene glycol ethers.

The extraction of the esterification solution may be carried out on a batch basis by mixing the said solution with an aqueous medium, permitting the solution to stand whereby it will separate into two phases, and then separating the two phases from contact with each other. This sequence of steps is then repeated as many times as necessary to remove from the esterification solution the water-soluble impurities present therein. Preferably, however, the extraction is carried out in a continuous manner. For example, the esterification solution may be passed through one or more extraction columns into which one or more streams of aqueous medium is introduced and through which the aqueous medium flows concurrent with or countercurrent to the esterification solution. During the extraction the water-soluble impurities that are present in the esterification solution, including organic acids and salts, dissolve in the water and are thereby effectively removed from the said esterification solution.

At the end of the extraction step, there is obtained a solution of the organic acid ester of cellulose in the water-immiscible solvent which is free from water-soluble impurities and which contains only a small proportion of water. This solution may be used for many purposes without further treatment. However, for some purposes it may be desirable to remove from this solution a further proportion of the water present therein, for example, by distilling the same or through the use of a dehydrating agent. Because of the small proportion of water initially present in the said solution, the removal of further quantities of water therefrom may be effected readily and without difficulty. It will usually be desirable to remove a portion of the water-immiscible solvent from the organic acid ester of cellulose solution to increase the concentration of the said solution so that it will be better suited for spinning operations. The removal of a portion of the solvent may be effected without difficulty by distilling the solvent from the solution. In some cases, it may, on the other hand, be preferred to add a further quantity of solvent to the solution to reduce the concentration of the organic acid ester of cellulose therein. The spinning properties of the solution may also be improved by adding thereto a proportion of a second and different solvent. For example, when methylene chloride is the water-immiscible solvent, the spinning properties of the solution may be improved by adding thereto a lower aliphatic alcohol such as methanol, ethanol, normal propanol or isopropanol. There may also be added to the solution pigments, dyes, plasticizers, fire-retardants and other materials capable of altering the appearance or properties of the final products.

It may also be desirable to treat the solution with a decolorizing agent such as activated charcoal, diatomaceous earth or fuller's earth to remove therefrom color-producing materials. The solution may also be filtered to remove particles therefrom such as bits of unacetylated cellulose, dirt and the like.

The solution or organic acid ester of cellulose obtained in this manner is well suited for spinning by conventional spinning techniques to form filaments, films and the like as well as for coatings and similar purposes. It is free from impurities that would interfere with the spinning operation or impair the properties of the products produced therefrom. Because no precipitation steps are involved in preparing the solutions, important economies can be achieved in such preparation. The organic acid ester of cellulose may, if desired, also be precipitated from such solution by mixing the same with a large excess of a non-solvent for the organic acid ester of cellulose, in which case there will be obtained a product which needs no further purification to prepare it for use.

The process of this invention is generally suited for the production of organic acid ester of cellulose, regardless of their degree of substitution. It is especially well suited for the production of organic acid esters of cellulose having a high degree of substitution such as triesters or cellulose esters having fewer than 0.2 free hydroxyl groups per anhydroglucose unit in the cellulose molecule, since it avoids the difficulties that are normally encountered in preparing such ester by the solution process.

The invention will now be described specifically in connection with the production of cellulose acetate which is commercially the most important organic acid ester of cellulose at the present time. However, it may also be employed for the production of other organic acid esters of cellulose including cellulose propionate, cellulose butyrate, cellulose acetate formate, cellulose acetate propionate, cellulose acetate butyrate and cellulose benzoate.

The following examples are given to illustrate this invention further.

*Example I*

Cellulose is first pretreated with 35% by weight of acetic acid and is then esterified with, for each 100 parts of weight of bone dry cellulose, 300 parts by weight of acetic anhydride, 1 part by weight of perchloric acid and 7.5 parts by weight of methylene chloride. Following the completion of the esterification, water is added to the esterification solution to react with the excess acetic anhydride, the perchloric acid catalyst is neutralized with pyridine, and the esterification solution is diluted with a further quantity of methylene chloride to give a solution containing 11.0% by weight of cellulose acetate, 16.3% by weight of acetic acid, 0.14% by weight of water and 0.045% by weight of perchlorate ions. The said solution is extracted with 5 volumes of an aqueous medium for each volume of solution, employing water alone for comparison purposes and employing a solution containing 2.5% by weight of various electrolytes. The results obtained are as follows:

| Electrolyte | Percent water in extracted solution | Percent reduction in water content with electrolyte |
|---|---|---|
| None | 0.94 | |
| $NH_4H_2PO_4$ | 0.55 | 41.5 |
| Na citrate | 0.57 | 39.4 |
| $Al_2(SO_4)_3$ | 0.55 | 41.5 |
| $NH_4$ acetate | 0.51 | 45.7 |
| Mg acetate | 0.39 | 58.5 |
| Ca acetate | 0.47 | 50.0 |
| $MgSO_4$ | 0.30 | 68.1 |
| Na acetate | 0.51 | 45.7 |
| $Na_2SO_4$ | 0.41 | 56.4 |
| $CaCl_2$ | 0.47 | 50.0 |
| NaCl | 0.41 | 56.4 |
| $AlCl_3$ | 0.38 | 59.5 |

When an extraction is carried out with an aqueous solution of urea as the extracting medium there is no significant difference in the water content of the extracted solution as compared with the use of water alone.

*Example II*

A cellulose acetate solution as described in Example I when extracted with water in a packed column shows a strong tendency to adhere both to the column walls and to the packing. There is added to the aqueous extracting medium 0.1% by weight of sodium lauryl sulfate and it is found that the surfaces of both the column and the packing medium remain clean during the extraction.

It is to be understood that the foregoing detailed description is given merely by way of illustration and that many variations may be made therein without departing from the spirit of my invention.

Having described my invention what I desire to secure by Letters Patent is:

1. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, and subjecting the solution to a two phase extraction with an aqueous medium having an electrolyte dissolved therein to remove water-soluble materials from the esterification solution, there being present during the extraction a sufficient proportion of water-immiscible solvent to prevent precipitation of the organic acid ester of cellulose from the solution.

2. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, and subjecting the solution to a two phase extraction with an aqueous medium having an electrolyte dissolved therein that will ionize to produce polyvalent ions to remove water-soluble materials from the esterification solution, there being present during the extraction a sufficient proportion of water-immiscible solvent to prevent precipitation of organic acid ester of cellulose from the solution.

3. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, and subjecting the solution to a two phase extraction with an aqueous medium having an electrolyte dissolved therein that will ionize to produce polyvalent anions to remove water-soluble materials from the esterification solution, there being present during the extraction a sufficient proportion of water-immiscible solvent to prevent precipitation of organic acid ester of cellulose from the solution.

4. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, and subjecting the solution to a two phase extraction with an aqueous medium having an electrolyte dissolved therein at a concentration to yield on complete ionization between about 0.1 to 1 gram-ions per liter to remove water-soluble materials from the esterification solution, there being present during the extraction a sufficient proportion of water-immiscible solvent to prevent precipitation of the organic acid ester of cellulose from the solution.

5. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, and subjecting the solution to a two phase extraction with an aqueous medium having an electrolyte dissolved therein that will ionize to produce polyvalent cations and polyvalent anions at a concentration to yield on complete ionization between about 0.1 and 1 gram-ions per liter to remove water-soluble materials from the esterification solution, there being present during the extraction a sufficient proportion of water-immiscible solvent to prevent precipitation of the organic acid ester of cellulose from the solution.

6. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, and subjecting the solution to a two phase extraction in the presence of a surface active agent with an aqueous medium having an electrolyte dissolved therein to remove water-soluble materials from the esterification solution, there being present during the extraction a sufficient proportion of water-immiscible solvent to prevent precipitation of the organic acid ester of cellulose from the solution.

7. In a process for the production of organic acid esters of cellulose, the step which comprises treating a solution of an organic acid ester of cellulose in a water-immiscible solvent, said solution containing water-soluble materials, by subjecting the same to a two phase extraction with an aqueous medium having an electrolyte dissolved therein to remove the water-soluble materials from the solution, there being present during the extraction a sufficient proportion of water-immiscible solvent to prevent precipitation of the organic acid ester of cellulose from the solution.

8. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, and subjecting the solution to a two phase extraction in the presence of a surface active agent with an aqueous medium to remove water-soluble materials from the esterification solution, there being present during the extraction a sufficient proportion of water-immiscible solvent to prevent precipitation of the organic acid ester of cellulose from the solution.

9. Process for preventing the adherence of a solution of an organic acid ester of cellulose in a water-immiscible solvent to a surface over which it flows, which comprises having a surface active agent present during such flow.

10. In a process for the production of cellulose acetate, the steps which comprise esterifying cellulose with acetic anhydride in the presence of a water-immiscible solvent whereby there will be obtained at the completion of the esterification a substantially homogeneous solution, and subjecting the solution to a two phase extraction with an aqueous medium having an electrolyte dissolved therein to remove water-soluble materials from the esterification solution, there being present during the extraction a sufficient proportion of water-immiscible solvent to prevent precipitation of the organic acid ester of cellulose from the solution.

11. In a process for the production of cellulose acetate, the steps which comprise esterifying cellulose with acetic anhydride in the presence of a water-immiscible solvent whereby there will be obtained at the completion of the esterification a substantially homogeneous solution, and subjecting the solution to a two phase extraction with an aqueous medium having an electrolyte dissolved therein that will ionize to produce polyvalent ions to remove water-soluble materials from the esterification solution, there being present during the extraction a sufficient proportion of water-immiscible solvent to prevent precipitation of the organic acid ester of cellulose from the solution.

12. In a process for the production of cellulose acetate, the steps which comprise esterifying cellulose with acetic anhydride in the presence of a water-immiscible solvent whereby there will be obtained at the completion of the esterification a substantially homogeneous solution, and subjecting the solution to a two phase extraction with an aqueous medium having an electrolyte dissolved therein that will ionize to produce polyvalent anions to remove water-soluble materials from the esterification solution, there being present during the extraction a sufficient proportion of water-immiscible solvent to prevent precipitation of the organic acid ester of cellulose from the solution.

13. In a process for the production of cellulose acetate, the steps which comprise esterifying cellulose with acetic anhydride in the presence of a water-immiscible solvent whereby there will be obtained at the completion of the esterification a substantially hemogeneous solution, and subjecting the solution to a two phase extraction with an aqueous medium having an electrolyte dissolved therein at a concentration to yield on complete ionization between about 0.1 and 1 gram-ions per liter to remove water-soluble materials from the esterification solution, there being present during the extraction a sufficient proportion of water-immiscible solvent to prevent precipitation of the organic acid ester of cellulose from the solution.

14. In a process for the production of cellulose acetate, the steps which comprise esterifying cellulose with acetic anhydride in the presence of a water-immiscible solvent whereby there will be obtained at the completion of the esterification a substantially homogeneous solution, and subjecting the solution to a two phase extraction in the presence of a surface active agent with an aqueous medium having an electrolyte dissolved therein to remove water-soluble materials from the esterification solution, there being present during the extraction a sufficient proportion of water-immiscible solvent to prevent precipitation of the organic acid ester of cellulose from the solution.

15. In a process for the production of cellulose acetate, the step which comprises treating a solution of cellulose acetate in a water-immiscible solvent, said solution containing water-soluble materials, by subjecting the same to a two phase extraction with an aqueous medium having an electrolyte dissolved therein to remove the water-soluble materials from the solution, there being present during the extraction a sufficient proportion of water-immiscible solvent to prevent precipitation of the organic acid ester of cellulose from the solution.

16. In a process for the production of cellulose acetate, the steps which comprise esterifying cellulose with acetic anhydride in the presence of a water-immiscible solvent whereby there will be obtained at the completion of the esterification a substantially homogeneous solution, and subjecting the solution to a two phase extraction in the presence of a surface active agent with an aqueous medium to remove water-soluble materials from the esterification solution, there being present during the extraction a sufficient proportion of water-immiscible solvent to prevent precipitation of the organic acid ester of cellulose from the solution.

17. Process for preventing the adherence of a solution of cellulose acetate in a water-immiscible solvent to a surface over which it flows, which comprises having a surface active agent present during such flow.

18. In a process for the production of cellulose acetate, the steps which comprise esterifying cellulose with acetic anhydride in the presence of methylene chloride whereby there will be obtained at the completion of the esterification a substantially homogeneous solution, and subjecting the solution to a two phase extraction with an aqueous medium having an electrolyte dissolved therein to remove water-soluble materials from the esterification solution, there being present during the extraction a sufficient proportion of methylene chloride to prevent precipitation of the organic acid ester of cellulose from the solution.

19. In a process for the production of cellulose acetate, the steps which comprise esterifying cellulose with acetic anhydride in the presence of methylene chloride whereby there will be obtained at the completion of the esterification a substantially homogeneous solution, and subjecting the solution to a two phase extraction with an aqueous medium having an electrolyte dissolved therein that will ionize to produce polyvalent anions and polyvalent cations at a concentration to yield on complete ionization between about 0.1 and 1 gram-ions per liter to remove water-soluble materials from the esterification solution, there being present during the extraction a sufficient proportion of methylene chloride to prevent precipitation of the organic acid ester of cellulose from the solution.

20. In a process for the production of cellulose acetate, the steps which comprise esterifying cellulose with acetic anhydride in the presence of methylene chloride whereby there will be obtained at the completion of the esterification a substantially homogeneous solution, and subjecting the solution to a two phase extraction with an aqueous medium having sodium citrate dissolved therein at a concentration to yield on complete ionization between about 0.1 and 1 gram-ions per liter to remove water-soluble materials from the esterification solution, there being present during the extraction a sufficient proportion of methylene chloride to prevent precipitation of the organic acid ester of cellulose from the solution.

References Cited in the file of this patent

UNITED STATES PATENTS

| | | |
|---|---|---|
| 2,073,853 | Schulze | Mar. 16, 1937 |
| 2,126,190 | Hofmann | Aug. 9, 1938 |
| 2,503,119 | McKinnis | Apr. 4, 1950 |